May 23, 1933.  C. S. ASH  1,911,049
WIRE WHEEL
Filed April 28, 1927
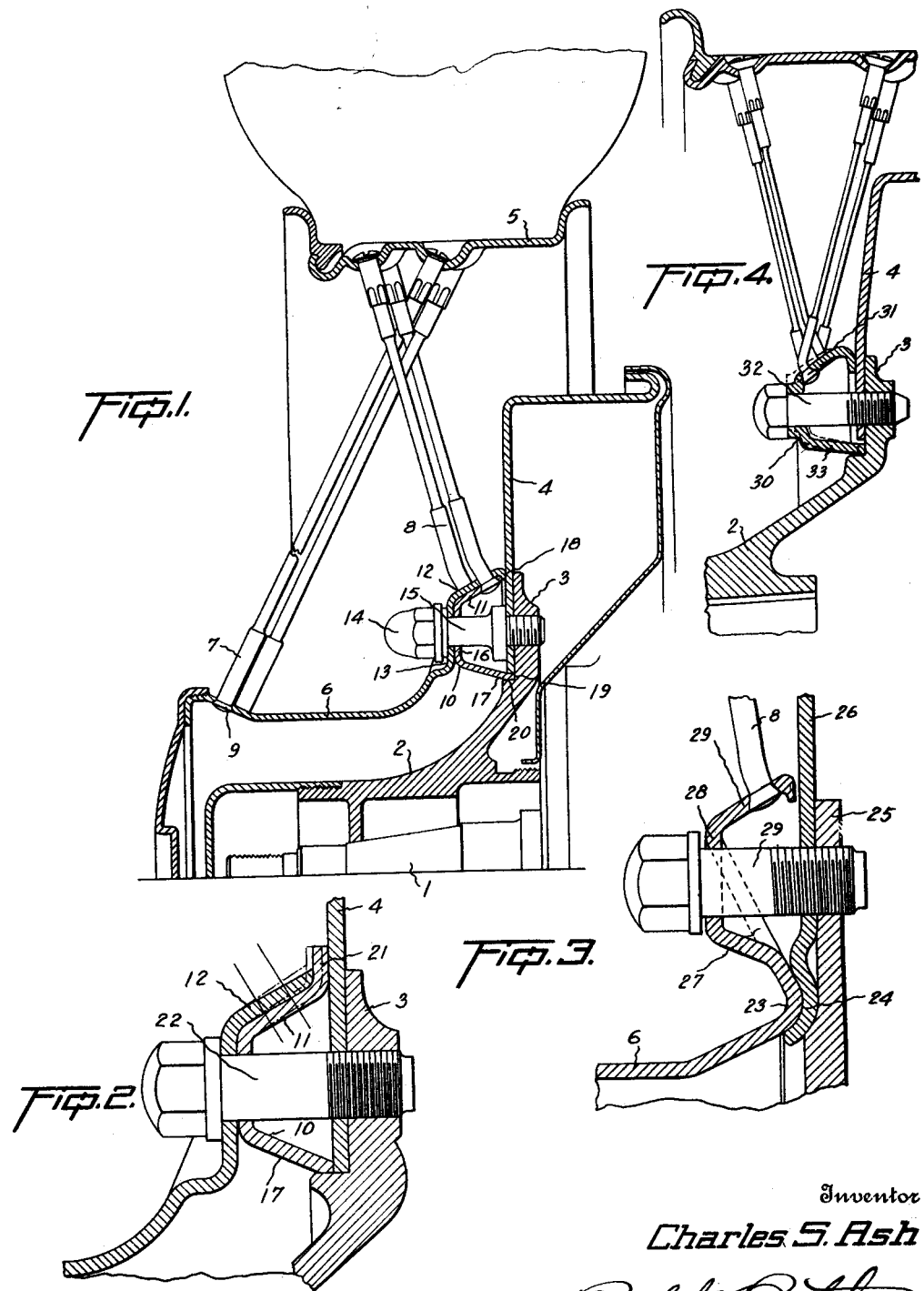
Inventor
Charles S. Ash
By [signature]
Attorney Patented May 23, 1933

1,911,049

UNITED STATES PATENT OFFICE

CHARLES S. ASH, OF ROYAL OAK, MICHIGAN, ASSIGNOR TO KELSEY-HAYES WHEEL CORPORATION, OF DETROIT, MICHIGAN, A CORPORATION OF NEW YORK

WIRE WHEEL

Application filed April 28, 1927. Serial No. 187,133.

This invention relates to motor vehicle wheels and their mountings, and particularly to the construction and mounting of wheels of the suspension type wherein spokes of the wire type and under tension connect the hub shell and rim of the wheel. An object of the invention is to simplify and facilitate construction and reduce the cost of manufacture, at the same time providing a very strong and efficient demountable wheel which is such that it may be readily applied to the usual hub structure and may be as readily demounted therefrom. It is also an object of the present invention to effect the locking of means for holding a demountable wheel in mounted position, by a stressing or flexing of the wheel mounting part and to firmly seat said part and hold the same seated by such flexing. A further object is to provide a wheel hub part which is such as to facilitate the threading of spokes into connection with the same, and which part provides a strong and rigid mounting for the wheel upon a hub structure, the construction being such that the mounting and securing of the wheel upon the hub will effect a tensioning of the spokes.

With the above and other ends in view, the invention consists in the matters hereinafter set forth and more particularly pointed out in the appended claims, reference being had to the accompanying drawing, in which—

Figure 1 is a vertical axial section through the upper half of a wheel and hub structure illustrative of an embodiment of the present invention;

Fig. 2 is an enlarged sectional detail showing a slightly modified construction;

Fig. 3 is a sectional detail showing a further modification; and

Fig. 4 is a view similar to that of Figure 1, showing another modified form.

In Figure 1 of the drawing, 1 indicates the stub end of a vehicle axle of any old and well known construction upon which the inner or hub proper 2 is mounted in the usual manner by bearings (not shown) interposed between the hub and stub to support the hub for free rotation thereon or where the axle includes a live or drive shaft, the hub 2 may be connected to such shaft in any suitable manner and according to the usual practice, the construction of the hub 2 forming no part of the present invention except that in each case said hub is formed with the usual radial flange 3 to which the usual brake drum 4 is secured.

As shown in Figure 1 the wheel for mounting upon this hub comprises the usual rim 5 and the hub shell 6 with two rows of wire spokes 7 and 8 connecting the rim and shell, the row 7 of spokes being threaded through openings 9 in the shell near its outer end with the outer ends of this row preferably connected to the rim adjacent the center line of the rim. The inner end of the hub shell is flared outwardly and formed to embrace an annular channel member 10 with the outer wall 11 of said channel inclined outwardly to the axis of rotation of the wheel and with the adjacent annular portion 12 of the hub shell formed there-against and secured thereto in any suitable manner, said portion 12 of the wall of the shell and the wall 11 of the channel being formed with openings to receive the inner ends of the spokes of the row 8 which are threaded therethrough and connected at their outer ends to the rim 5, between the line of connection of the row 7 to the rim and the outer edge of said rim, the outer end portions of the two rows of spokes crossing each other.

Depressions 13 are formed in the shell wall just inwardly of the inclined annular portion 12, with the bottoms of said depressions lying in a plane at right angles to the axis of rotation of the wheel and forming seats for a nut 14 on the ends of stud bolts 15 which are screwed into openings in the flange 3 to project outwardly through openings in said wall of the shell at said seats and through openings in the bottom wall 16 of the channel member 10. The inner side wall or flange 17 of the channel member is preferably of slightly greater width than the width of the flange 11 at its outer side, so that when the shell is slipped endwise over the inner hub 2 in mounting the wheel, the said flange 17 will seat at its edge against the hub flange 3, before the peripheral edge 18 of the shell and wall 11 will seat against said hub flange or drum wall secured thereto. Therefore when the nuts 14 are turned up, the channel member will be rocked transversely about the seating edge 19 of its flange 17 as a fulcrum, thus deflecting said channel and forcing the annular portion 12 of the shell toward the hub flange 3 until the seating edge 18 seats firmly against the outer surface of the drum wall.

The annular channel member is therefore distorted slightly and as the edge portion of the annular inner end portion 12 of the shell is folded inwardly over the edge of the channel flange 11, as shown, or otherwise secured thereto, the shell portion 12 will also be deflected, thus, in effect, elongating the shell slightly and moving the annular edge portion 12 into which the row of spokes 8 is threaded, longitudinally of the shell and away from the line of connection of the row 7 to the outer end of the shell. This distortion or deflection of the inner end portion of the shell about the seat 19 of the inner flange of the annular member on the hub flange, will therefore, increase the tension of the spokes, and at the same time will put a spring tension therein which will be exerted continuously against the nuts 14 to prevent them from becoming loose on their studs. The annular channel member therefore not only provides a seat for the shell on the hub flange, but also a fulcrum inwardly from the end edge of the shell and a reinforcement for said end portion of the shell through which the stud bolts extend, which bolts form the sole means for securing the wheel detachably in place on the hub.

By providing a seating part inwardly of the securing bolts and inwardly of the end edge of the shell, when the seating part is seated and strain is put on the shell outwardly of said seat by the securing bolts, said seat becomes a fulcrum over which the end portion of the shell is deflected to put a spring tension therein, which tension exerts a continuous pressure or force against the nuts on the bolts and holds these nuts against becoming loose during the running of the wheel. Other means for locking the nuts is thus unnecessary and a very simple construction which is cheap to manufacture is secured and mounting or demounting of the wheel is facilitated, and when in place, is rigidly and securely held. The seating of the shell inwardly of its end edge portion into which one row of spokes is laced, also causes a slight elongation of the shell when this end portion is deflected over its seat or fulcrum, and the spokes are thus put under further strain by the mounting of the wheel on its hub. It is important that the shell and channel member be so constructed that when the hub shell is slipped into place on the hub, one flange of the channel will seat before the other and hold the unseated edge away from its seat on the hub flange so that one flange will function as a fulcrum to cause a deflection when the nuts 14 are turned up, of that portion of the channel and shell which extends laterally from said fulcrum.

As shown, the hub flange 3 is preferably formed with an annular shoulder 20 forming a seat for the edge 19 of the flange 17 and also forms means for centering the shell on the hub, in mounting.

As above described, the walls 11 and 12 of the channel member and end portion of the shell, respectively, are inclined outwardly from the bottom of the channel toward the end of the shell and this arrangement facilitates the threading of the spokes 8 through the openings in these walls, the spokes being inserted endwise through the open side of the channel member, the opposite side wall 17 of which is preferably inclined inwardly of the shell from the bottom of the channel toward its open side, thus further increasing the width of the open side of the channel to facilitate the threading of the spokes through their openings.

A slight modification of the construction shown in Figure 1 is shown in Figure 2 in that the free edge portion 21 of the flange 11 is turned outwardly beneath the edge of the shell wall 12 to seat against the drum wall 4 when said annular end portion of the shell is deflected by the seating of the flange 17 and the force exerted by the bolts 22 which instead of being stud bolts are ordinary bolts engaging screw-threaded openings in the hub flange 3. In this construction, and as indicated in dotted lines, before the bolts 22 are turned up, the flange 17 seats and the edge portion 21 is out of contact with the hub flange or drum wall which wall is secured thereto and forms the face of said flange.

A further modified construction is shown in Figure 3 wherein the annular channel member instead of being formed from a separate piece, is formed integral with the hub shell by forming the end portion of the shell wall into channel form. The wall of the shell 6 is flared outwardly near its inner end and formed with a comparatively abrupt bend forming a shoulder 23 adapted to seat in a suitable seat 24 therefor formed on the radial hub flange 25 by curving the inner edge portion of the drum wall 26 which is secured in any suitable manner against the outer face of the flange. If desired, this seat 24 may be formed on the flange itself or in any other suitable manner. Outwardly of the shoulder 23, the wall of the shell is extended outwardly and inclined toward the outer end of the shell, providing an inclined wall 27 which at suitable intervals is formed with seats 28 for the heads of bolts 29 engaging screw-threaded openings in the drum wall 26 and flange 25. Outwardly of the inclined portion 27, the wall is again bent at nearly right angles to the portion 27 to form an annular edge portion 29 corresponding to the portion 12 of Figure 1 and formed with openings through which the spokes are threaded. The annular edge channel thus formed by the wall portions 27 and 29, is so formed that in its normal condition, the shoulder 23 will engage its seat 24 in mounting the wheel with the edge of the annular wall 29 out of contact with the drum wall 26, and therefore when the bolts 29 are turned up in securing the wheel in place, the end portion of the shell outwardly of said shoulder 23 will be flexed and put a strain on said bolts to hold them against working loose.

As shown in Figure 4, a channel ring 30 may be substituted for the hub shell of the other constructions shown, this ring forming the hub portion of the wheel into which all of the spokes are laced at their inner ends, the outer inclined wall 31 of this channel ring being provided with openings through which the spokes are laced. The bottom wall of this channel ring is formed with openings to receive the bolts 32 for detachably securing the wheel in place and which bolts are screwed into screw-threaded openings in the radial hub flange 3. In this construction, the spokes are so laced into this ring and the relative widths of the flanges 31 and 33 are such that when said ring is drawn to its seat against the hub flange 3, the edge or seating portion of the outer flange 31 will seat first, and then by further turning of the bolts 32, the inner flange 33 will be brought to its seat, turning or flexing the ring about the seated edge of the wall 31 as a fulcrum, and after it has been so flexed and the edge of the wall 33 brought to seat on the drum wall, the bolts may be further tightened to spring the walls of the channel and the bolts will be firmly held against working loose both by the tendency of the flexed ring to spring back to normal and by the guiding of the walls thereof. As the channel ring is open at its seating side and as the inner side of the wall 31 thereof, due to its inclination, faces toward said open side, the spokes may be readily passed endwise through said open side of the ring and through the openings therefor in the said wall, and in securing the wheel in place by the bolts 32, the spokes will be placed under further tension by the flexing or rocking of said ring about its edge which first comes to its seat.

In each of the several constructions illustrated, the flexing of a part about a fulcrum located radially of the means for securing the wheel in place, creates a tension on the securing means to hold the same against becoming loose in use, and the assembly of the spokes is greatly facilitated by the open channel construction which permits of the threading of the spokes into place through the open side of this channel. Obviously other constructions embodying these features of the present invention as broadly interpreted and as set forth in the appended claims, may be employed and I do not therefore limit myself to the particular constructions and arrangements shown.

What I claim is:—

1. A demountable wheel including a rim, an annular channel member and spokes connecting said rim and member with said spokes threaded through openings in one side of said channel, said channel being adapted to seat at its edges upon a hub part and constructed to seat at one edge in advance of the seating of the other, and bolts for detachably securing said channel member with its seating edges seated on said hub part.

2. A demountable wheel including a wheel-hub part providing a wall formed with openings for the threading of wire spokes therethrough into connection therewith and a wall adapted to seat upon an inner hub part and form a fulcrum support for the wall to which the spokes are connected, and means engaging the inner hub part and passing through a wall of the wheel-hub part for demountably securing said wheel in place and operative to flex the wheel-hub part about said fulcrum to effect a tensioning of said spokes.

3. A demountable wheel including a wheel hub member providing an annular channel of substantially U-shape in cross section with the open side of said channel opening toward the inner end of the wheel hub, the side flanges of the channel forming inner and outer walls spaced apart radially of the wheel, with said walls of substantially equal width in cross section, to seat adjacent the free edges of said walls upon an inner hub part, wire spokes connected at their inner ends to said outer side wall of the channel, and bolts passing through openings in the bottom of said channel for securing said channel to an inner wheel hub with the edge portions of the side walls of said channel seated upon seats on the inner hub.

4. The combination with a hub having a hub part, of a wheel detachably attached to said hub part, said wheel including a rim, a hub member, and spokes connecting said hub member and rim, and means for detachably attaching said hub member to said hub part, said hub member being formed to seat upon said hub part at one side of said attaching means in advance of its seating thereon at the other side of said attaching means whereby said hub member is subjected to a twisting strain by said attaching means when force is applied to said hub member by said attaching means in securing the wheel in place upon said hub.

5. A demountable wheel including a wheel hub part providing an annular channel with the open side of said channel open toward the inner side of the wheel and with a wall of said channel provided with openings and inclined radially outward of the wheel toward the open side of the channel to facilitate the threading of spokes inserted through the open side of the channel into said openings in said wall, the edge portions of the walls of said channel being both substantially within the same plane transverse to the axis of rotation of the wheel and forming seating portions to engage seats on an inner hub part, and means for detachably securing the wheel to said inner hub with said edge portions of the channel walls seated upon said seats.

6. The combination with a hub having a radial flange, of a wheel for detachable mounting upon said hub, said wheel comprising a rim, a hub shell, and wire spokes connecting said shell and rim, said shell being flared outwardly at its inner end and formed to embrace an annular channel ring which is of substantially U-shape in cross section, said channel ring being within said flared end of said shell, the wall of said shell and the outer flange of said channel member being formed with openings through which said spokes are threaded, said channel being of greater width in cross section at its open side than at its closed side to permit the insertion of said spokes into said openings through the open side of the channel, the inner flange of said channel member being seated at its edge upon said radial flange radially inward of the wheel from the inner end of the shell, and bolts engaging said radial flange on the hub and projecting through openings in the channel ring and shell wall radially outward of the wheel from said inner flange of the ring.

7. A vehicle wheel having in combination, a hub shell, a hub extending within the shell having a forwardly projecting flange, means for supporting the shell upon the hub including an annular member secured to the shell within the latter and having a rearwardly projecting resilient flange adapted to seat upon the hub flange aforesaid.

In testimony whereof I affix my signature.

CHARLES S. ASH.